United States Patent
Minowa

(10) Patent No.: US 9,395,590 B2
(45) Date of Patent: Jul. 19, 2016

(54) LIQUID CRYSTAL DISPLAY

(71) Applicant: MITSUBISHI ELECTRIC CORPORATION, Tokyo (JP)

(72) Inventor: Kenichi Minowa, Kumamoto (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 64 days.

(21) Appl. No.: 13/931,011

(22) Filed: Jun. 28, 2013

(65) Prior Publication Data

US 2014/0009712 A1 Jan. 9, 2014

(30) Foreign Application Priority Data

Jul. 4, 2012 (JP) ................................. 2012-150104

(51) Int. Cl.
  *G02F 1/1337* (2006.01)
  *G02F 1/1362* (2006.01)
  *G02F 1/1343* (2006.01)

(52) U.S. Cl.
  CPC ........ *G02F 1/136286* (2013.01); *G02F 1/1337* (2013.01); *G02F 1/134363* (2013.01)

(58) Field of Classification Search
  CPC .............. G02F 1/13394; G02F 1/1339; G02F 1/133707; G02F 1/1393; G02F 1/1337; G02F 1/136286; G02F 1/134363
  USPC ......................................... 349/129, 123, 156
  See application file for complete search history.

(56) References Cited

U.S. PATENT DOCUMENTS

| 6,433,852 | B1 | 8/2002 | Sonoda et al. |
| 6,950,165 | B2 | 9/2005 | Matsumoto et al. |
| 2008/0192198 | A1* | 8/2008 | Na et al. ......................... 349/187 |
| 2009/0231530 | A1* | 9/2009 | Nishimura ............. G02F 1/1323 349/129 |
| 2012/0081651 | A1* | 4/2012 | Misaki .................. G02F 1/1339 349/153 |
| 2012/0212701 | A1* | 8/2012 | Hwang .................. G06F 3/0412 349/155 |

FOREIGN PATENT DOCUMENTS

| JP | 2000-171808 A | 6/2000 |
| JP | 2003-295207 A | 10/2003 |

OTHER PUBLICATIONS

An Office Action; "Notification of Reason(s) for Refusal," issued by the Japanese Patent Office on Jan. 5, 2016, which corresponds to Japanese Patent Application No. 2012-150104 and is related to U.S. Appl. No. 13/931,011; with English language translation.

* cited by examiner

*Primary Examiner* — Nathanael R Briggs
*Assistant Examiner* — William Peterson
(74) *Attorney, Agent, or Firm* — Studebaker & Brackett PC

(57) ABSTRACT

A thin film transistor substrate includes a source line and a gate line arranged to cross each other in a grid pattern, and a thin film transistor arranged at the intersection between the source line and the gate line. The source line is covered with an insulating film, and the insulating film is covered with a first alignment film. An opposite substrate includes a protrusion arranged so as to protrude toward the thin film transistor substrate. With the thin film transistor substrate and the opposite substrate arranged to face each other, the protrusion is arranged so as to cover the source line from above and to extend in a direction in which the source line extends. The protrusion has a conductive film arranged on an edge surface of the protrusion near the source line. The protrusion and the conductive film are covered with a second alignment film.

6 Claims, 3 Drawing Sheets

LIQUID CRYSTAL DISPLAY

BACKGROUND OF THE INVENTION

1. Field of the Invention

The present invention relates to a liquid crystal display and more specifically, to an active-matrix liquid crystal display driven by a thin film transistor.

2. Description of the Background Art

In recent years, FPDs (flat panel displays) such as liquid crystal panels have been used in many fields such as televisions, car navigation systems and computers for reasons such as lightweight and thin properties and low power consumption. These FPDs are requested to achieve higher display qualities year after year, and employing a driving system suitable for increasing a contrast and a viewing angle has become a mainstream tendency.

In particular, an IPS (in-plane switching) driving system is suitable for satisfying the aforementioned quality requirements, and has been employed by an increasing number of liquid crystal manufacturers. However, the IPS driving system is not an efficient system in terms of manufacture, so that increasing yield in manufacturing factories is an absolute necessity.

In a general liquid crystal display of the IPS driving system, substrates in a pair facing each other are spaced a constant distance by a spacer, and liquid crystal fills in the space between the substrates. One of the substrates is an active-matrix substrate (TFT substrate) including source lines and gate lines arranged to cross each other in a grid pattern, and thin film transistors arranged at the intersections. A pixel electrode and a common electrode are formed on the same substrate, and electric charges accumulated between these electrodes control driving of the liquid crystal. Generally, a transparent film made of a material such as ITO (indium tin oxide) and IZO (indium zinc oxide) is used as a conductive film.

The other substrate is a color filter (CF) substrate including a black matrix (hereinafter called BM) to shield a domain region of a liquid crystal, a color layer, an organic film layer, and a columnar spacer. The CF substrate does not include a conductive film.

The IPS driving system achieves increase in a viewing angle by forming the pixel electrode and the common electrode on the same substrate as described above, and generating an electric field (lateral electric field) in a direction parallel with the substrate, thereby moving liquid crystal molecules laterally. Hence, liquid crystal orientation at the side of the source line is disturbed due to the effect of the electric field generated from the source line.

Japanese Patent Application Laid-Open No. 2003-295207 discloses a technique intended to prevent this problem. According to this technique, a conductive film (common electrode) is formed over the source line via an insulating film. In Japanese Patent Application Laid-Open No. 2003-295207, forming the common electrode over the source line via the insulating film prevents disturbance of the electric field generated from the source line.

However, if a defect (foreign matter or damage) is generated in the insulating film, forming the common electrode over the source line via the insulating film may generate a short between the source line and the common electrode, and this short may be visually recognized as a linear defect.

A dot-like defect may be generated in a liquid crystal panel, and this defect is not conspicuous in many cases. In contrast, a linear defect is generally recognized visually as a defect of a length same as that of the source line and corresponding substantially to the length of one side of a display panel. The aforementioned short, generated even in one place of the source line, is recognized visually as a conspicuous defect, leading to high manufacturing risk. It is important to take action for recovery in response to generation of this problem. Meanwhile, a short generated in any place of the source line becomes a linear defect. Hence, a place of the defect is difficult to specify and action for recovery cannot be taken, resulting in reduction in manufacturing yield. Difficulty in specifying a place of the defect takes a long time to find out a cause of the defect, making diagnosis of the cause a troublesome task.

As described above, in the liquid crystal display of the IPS driving system, a linear defect is generated with a high probability due to a short between the source line and the common electrode, resulting in reduction in manufacturing yield.

SUMMARY OF THE INVENTION

It is an object of the present invention to provide a liquid crystal display of an IPS driving system that does not degrade the performance of the liquid crystal display and does not reduce manufacturing yield.

According to an aspect of the liquid crystal display of the present invention, the liquid crystal display drives liquid crystal molecules laterally with a lateral electric field. The liquid crystal display includes: a thin film transistor substrate with a plurality of pixel regions arranged in a matrix; an opposite substrate with a color filter arranged in a position corresponding to those of the pixel regions; and a liquid crystal held between the thin film transistor substrate and the opposite substrate arranged to face each other. The thin film transistor substrate includes a source line and a gate line arranged to cross each other in a grid pattern, and a thin film transistor arranged at the intersection between the source line and the gate line. The source line is covered with an insulating film and the insulating film is covered with a first alignment film. The opposite substrate includes a protrusion arranged so as to protrude toward the thin film transistor substrate. With the thin film transistor substrate and the opposite substrate arranged to face each other, the protrusion is arranged so as to cover the source line from above and to extend in a direction in which the source line extends. The protrusion has a conductive film arranged on an edge surface of the protrusion near the source line. The protrusion and the conductive film are covered with a second alignment film.

In this liquid crystal display, an electric field generated from the source line is shielded by the conductive film. Thus, the electric field generated from the source line does not disturb a lateral electric field to drive the liquid crystal, so that the liquid crystal molecules are driven in parallel with a substrate surface and arrangement of the liquid crystal molecules at the side of the source line is unlikely to be disturbed. As a result, reduction in contrast and reduction in aperture ratio are suppressed at the side of the source line, thereby allowing suppression of reduction in image quality. Further, the conductive film arranged on the edge surface of the protrusion near the source line is an electrically floating condition. Thus, even if a defect such as a foreign matter is generated in the insulating film on the source line and the source line and the conductive film are electrically connected via the defect, the source line and the conductive film are not shorted to each other via the defect. As a result, a linear defect due to a short in the source line is not generated. Thus, a linear defect is not recognized visually when a liquid crystal panel is driven, thereby preventing reduction in manufacturing yield.

These and other objects, features, aspects and advantages of the present invention will become more apparent from the following detailed description of the present invention when taken in conjunction with the accompanying drawings.

EMBODIMENT FOR CARRYING OUT THE INVENTION

Preferred Embodiment

A preferred embodiment of a liquid crystal display of the present invention is described below by referring to FIGS. 1 to 3. The liquid crystal display of the present invention is described as an active-matrix liquid crystal display driven by a TFT (thin film transistor).

Figure 1:
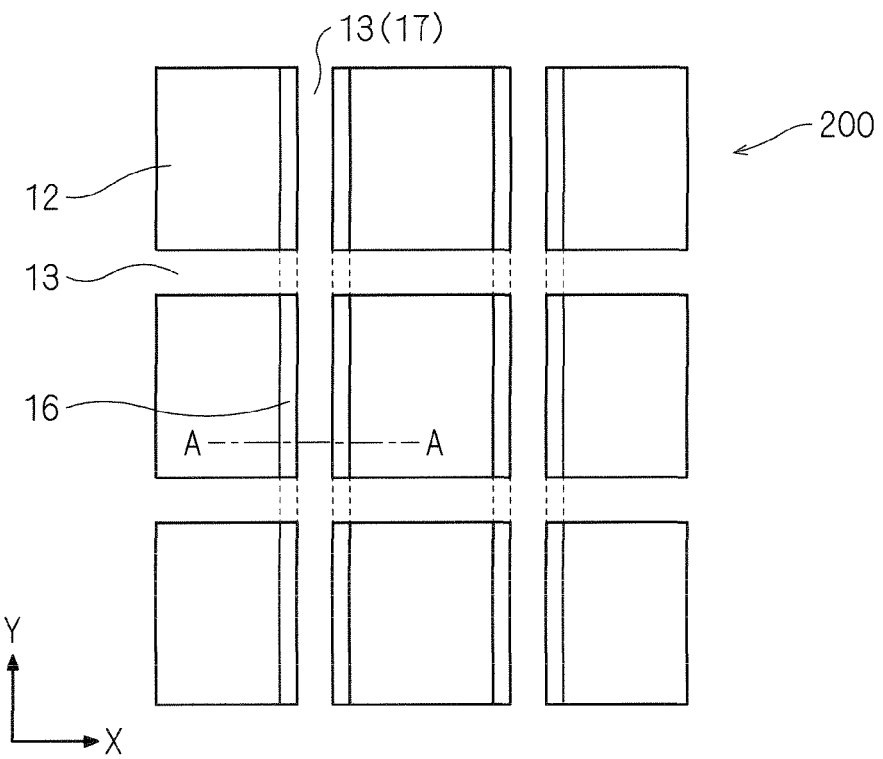
FIG. 1 is a partial plan view showing a liquid crystal display according to a preferred embodiment of the present invention as taken from an opposite substrate of a liquid crystal panel.

FIG. 1 is a partial plan view showing a liquid crystal panel of the liquid crystal display as taken from an opposite substrate. For the sake of convenience, an overcoat film is omitted from FIG. 1. FIG. 2 is a sectional view taken along line A-A of FIG. 1. FIG. 3 is a plan view showing the structure of a TFT substrate in a partial region of FIG. 1.

As shown in FIG. 1, an opposite substrate 200 is a color filter substrate with a color filter. Multiple color layers 12 forming the color filter are arranged in X and Y directions in a matrix, and a black matrix (BM) 13 to shield a domain region of a liquid crystal is laid out in a grid pattern between the color layers 12. A protrusion 16 is provided below part of the BM 13 that extends in the Y direction so as to extend along this part of the BM 13.

Figure 2:
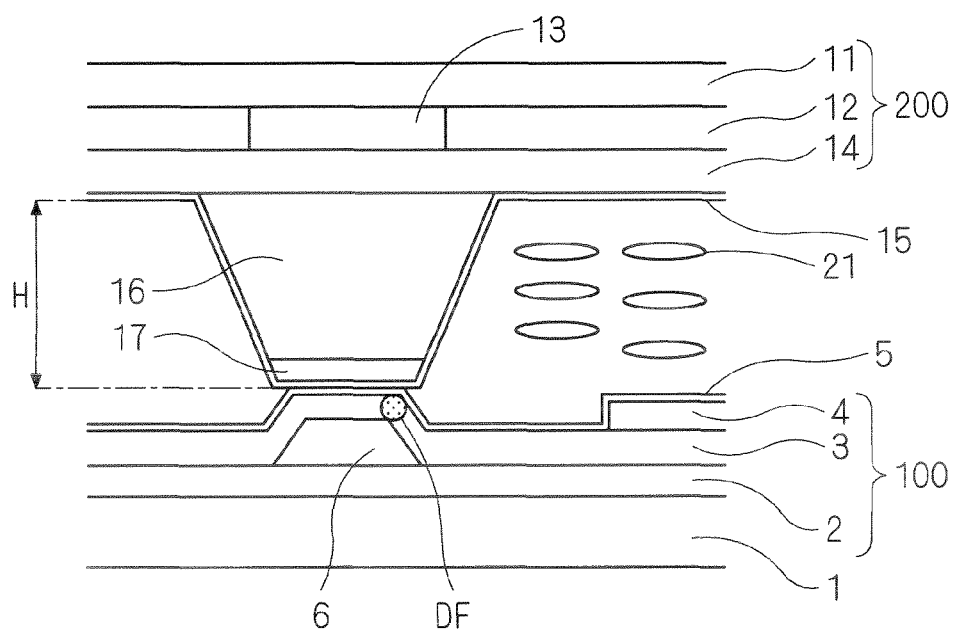
FIG. 2 is a partial sectional view showing the liquid crystal panel of the liquid crystal display according to the preferred embodiment of the present invention.

As shown in FIG. 2, the liquid crystal display of the present invention includes a TFT substrate 100 and the opposite substrate 200 facing each other, and liquid crystal molecules 21 are held between these substrates.

In the TFT substrate 100, a below-source insulating film 2 is arranged on a glass substrate 1, a source line 6 is arranged on the below-source insulating film 2, and an above-source insulating film 3 is arranged so as to cover the source line 6 and the below-source insulating film 2. Further, a pixel electrode 4 is arranged on the above-source insulating film 3, and an alignment film 5 is arranged so as to cover the pixel electrode 4 and the above-source insulating film 3. The alignment film 5 is provided for arrangement of the liquid crystal molecules 21, and is made of polyimide, for example.

In the opposite substrate 200, the color layers 12 are arranged on a glass substrate 11 to be spaced apart from each other, and the BM 13 is arranged between the color layers 12. Further, an organic overcoat film 14 is arranged so as to cover the color layers 12 and the BM 13, and the protrusion 16 protruding toward the source line 6 is arranged above the overcoat film 14 via an alignment film 15. The alignment film 15 is provided for arrangement of the liquid crystal molecules 21, and is made of polyimide, for example.

The protrusion 16 is arranged above the source line 6 so as to extend in a direction in which the source line 6 extends. The protrusion 16 is trapezoidal in cross section, with a wide edge surface near the glass substrate 11 and a narrow edge surface near the source line 6. The edge surface of the protrusion 16 near the source line 6 is covered with a conductive film 17. The protrusion 16 and the conductive film 17 are covered with the alignment film 15.

Figure 3:
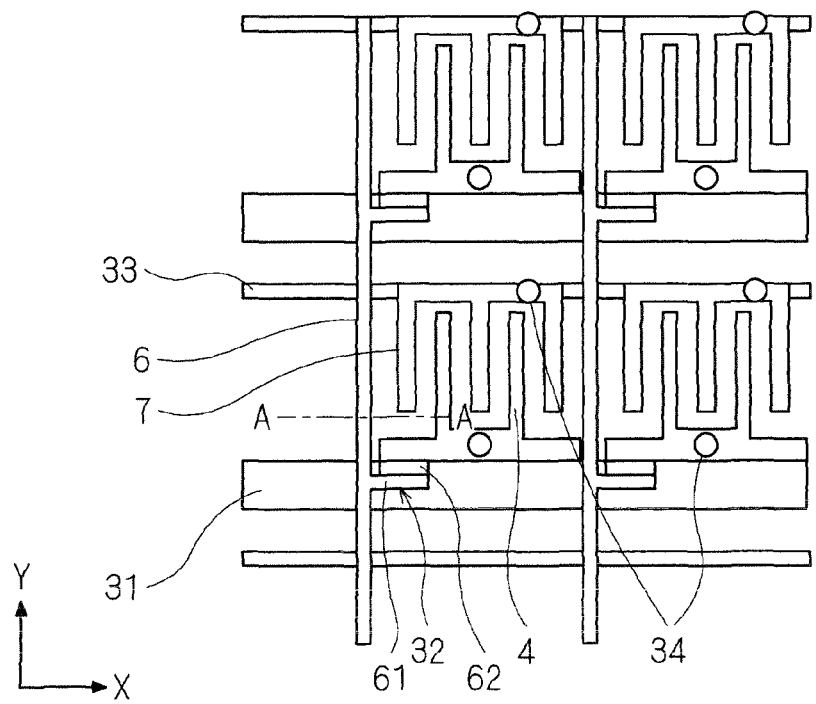
FIG. 3 is a plan view showing the structure a TFT substrate of the liquid crystal display according to the preferred embodiment of the present invention.

As shown in FIG. 3, the source lines 6 and gate lines 31 of the TFT substrate 100 are arranged to cross each other in a grid pattern, and thin film transistors (TFTs) 32 are arranged at the intersections as switching elements to drive the liquid crystal panel. A region surrounded by adjacent gate lines 31 and adjacent source lines 6 is a pixel region, and such pixel regions are arranged in a matrix in the TFT substrate 100. Each of the pixel regions includes multiple pixel electrodes 4 and multiple common electrodes 7 arranged in the same layer so as to extend in parallel alternately.

The pixel electrodes 4 and the common electrodes 7 both extend in parallel with the source lines 6. Ends on one side of both of the pixel electrodes 4 and the common electrodes 7 are at positions beyond the center of the pixel region. Ends on the opposite side of the common electrodes 7 are mutually connected above an auxiliary capacitance line 33. Ends on the opposite side of the pixel electrodes 4 are mutually connected above a drain electrode not shown in the drawings.

The aforementioned shapes of the pixel electrodes 4 and the common electrodes 7 are merely examples. The shapes and the like of the pixel electrodes 4 and the common electrodes 7 can be determined in different ways as long as these electrodes are arranged in the same layer.

The auxiliary capacitance line 33 is arranged in parallel with the gate line 31 so as to form a pair with the gate line 31. The common electrodes 7 are electrically connected to the auxiliary capacitance line 33 via a contact hole 34. The pixel electrodes 4 are electrically connected to the drain electrode not shown in the drawings via a contact hole 34.

The gate line 31 is formed so as to be integral with a gate electrode of the TFT 32 in each pixel. A region corresponding to that above a part of the gate line 31 belonging to the TFT 32 is a channel region 62. A source electrode 61 extending from the source line 6 is arranged in parallel with the channel region 62, and the drain electrode not shown in the drawings is arranged on the opposite side of the source electrode 61.

As described above, in the TFT substrate 100, the pixel electrodes 4 and the common electrodes 7 are arranged in parallel on the substrate, and electric charges accumulated between the pixel electrodes 4 and the common electrodes 7 generate a lateral electric field, thereby driving the liquid crystal molecules 21 horizontally (laterally).

A transparent conductive film made of a material such as ITO and IZO, and a metal film made of a material such as Cr and Al, are applicable as a conductive film to form the aforementioned electrodes. The alignment film 5 is arranged on the entire surfaces of these electrodes.

The protrusion 16 provided inside the opposite substrate 200 is formed into a linear shape extending entirely across a region facing the source line 6. The conductive film 17 provided at an edge portion of the protrusion 16 is an electrically floating condition, specifically, is formed independently of the edge portion of the protrusion 16. The protrusion 16 is covered with the alignment film 15 so as not to electrically contact a line or an electrode.

As shown in FIG. 2, the thicknesses of the protrusion 16 and the conductive film 17 are determined such that, with the TFT substrate 100 and the opposite substrate 200 facing each other, the conductive film 17 arranged at the edge portion of the protrusion 16 contacts the above-source insulating film 3 covering the source line 6 via the alignment films 15 and 5.

The protrusion 16 is composed of an insulator such as an organic film, and the conductive film 17 is composed of an ITO film or a metal film, for example.

As described above, the insulating protrusion 16 is provided inside the opposite substrate 200, the conductive film 17 is arranged at the edge portion of the protrusion 16, and the conductive film 17 is formed so as to contact the above-source insulating film 3 covering the source line 6 via the alignment films 15 and 5. As a result, an electric field generated from the source line 6 is shielded by the conductive film 17. Thus, the electric field generated from the source line 6 does not disturb a lateral electric field to drive the liquid crystal molecules 21, so that the liquid crystal molecules 21 are driven in parallel with a substrate surface and arrangement of the liquid crystal molecules 21 at the side of the source line 6 is unlikely to be disturbed. As a result, reduction in contrast and reduction in aperture ratio are suppressed at the side of the source line 6, thereby allowing suppression of reduction in image quality.

According to the aforementioned structure, the conductive film 17 formed at the edge portion of the protrusion 16 is an electrically floating condition. Thus, even if a defect DF such as a foreign matter is generated in the above-source insulating film 3 on the source line 6 and the source line 6 and the conductive film 17 are electrically connected via the defect DF, the source line 6 and the conductive film 17 are not shorted to each other via the defect DF.

To be specific, the source line 6 is not shorted to the protrusion 16 and the conductive film 17 provided to shield an electric field generated from the source line 6, so that a linear defect due to a short in the source line 6 is not generated. Thus, a linear defect is not recognized visually when the liquid crystal panel is driven, thereby preventing reduction in manufacturing yield.

The conductive film 17 provided at the edge portion of the protrusion 16 in the opposite substrate 200 and the above-source insulating film 3 provided on the source line 6 in the TFT substrate 100 tightly contact each other via the alignment films 5 and 15. This prevents entry of the liquid crystal molecules 21 into space above the source line 6, thereby achieving the effect of preventing disturbance of arrangement of the liquid crystal molecules 21.

In order to achieve this effect, it is desirable that a combined height of the protrusion 16 and the conductive film 17 be the same as a cell gap of the liquid crystal panel, specifically a gap between the apex of the TFT substrate 100 and the apex of the opposite substrate 200. In FIG. 2, the cell gap is indicated by H.

In the aforementioned structure, the conductive film 17 and the above-source insulating film 3 tightly contact each other via the alignment films 5 and 15. Meanwhile, even if the alignment films 5 and 15 do not contact each other and a gap is formed therebetween, the conductive film 17 can still shield an electric field generated from the source line 6.

Making the conductive film 17 wider than the source line 6 can reliably shield an electric field generated from the source line 6. Meanwhile, the width of the conductive film 17 is determined based on the cell gap and the combined height of the protrusion 16 and the conductive film 17, for example.

Modification

A modification of the preferred embodiment of the liquid crystal display of the present invention is described next by referring to FIGS. 4 to 6.

Figure 4:
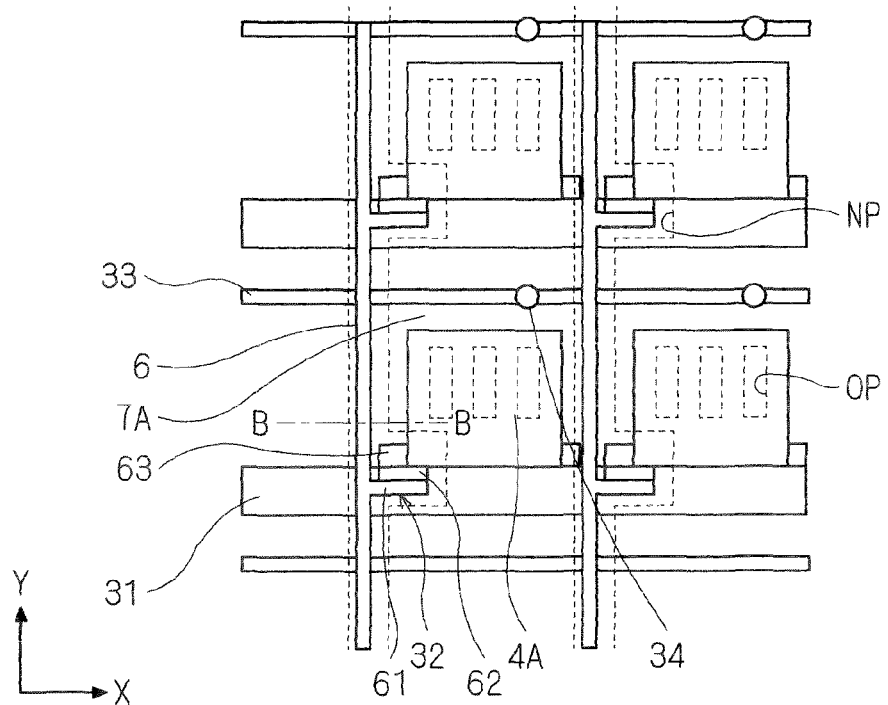
FIG. 4 is a plan view showing the structure of a TFT substrate according to a modification of the liquid crystal display of the preferred embodiment of the present invention.

FIG. 4 is a plan view showing the structure of a TFT substrate determined by applying the present invention to a liquid crystal display of an IPS-FFS (fringe field switching) structure. FIG. 5 is a sectional view taken along line B-B of FIG. 4. A partial plan view showing a liquid crystal panel of the liquid crystal display as taken from an opposite substrate is the same as that of FIG. 1.

In the liquid crystal display of the IPS-FFS structure, a common electrode and a pixel electrode provided in the TFT substrate are formed in different layers while an insulating film is placed between these layers. To be specific, as shown in FIG. 4, source lines 6 and gate lines 31 are arranged to cross each other in a grid pattern, and thin film transistors (TFTs) 32 are arranged at the intersections as switching elements to drive the liquid crystal panel. A region surrounded by adjacent gate lines 31 and adjacent source lines 6 is a pixel region, and such pixel regions are arranged in a matrix. Each of the pixel regions includes pixel electrodes 4A in the form of a flat plate. Common electrodes 7A are each arranged above the pixel electrodes 4A so as to extend over multiple pixel regions. The common electrodes 7A are each arranged as an electrode common to multiple pixel electrodes 4A arranged in the Y direction of the drawings, and are indicated by dashed lines in FIG. 4 for the sake of convenience.

Figure 6:
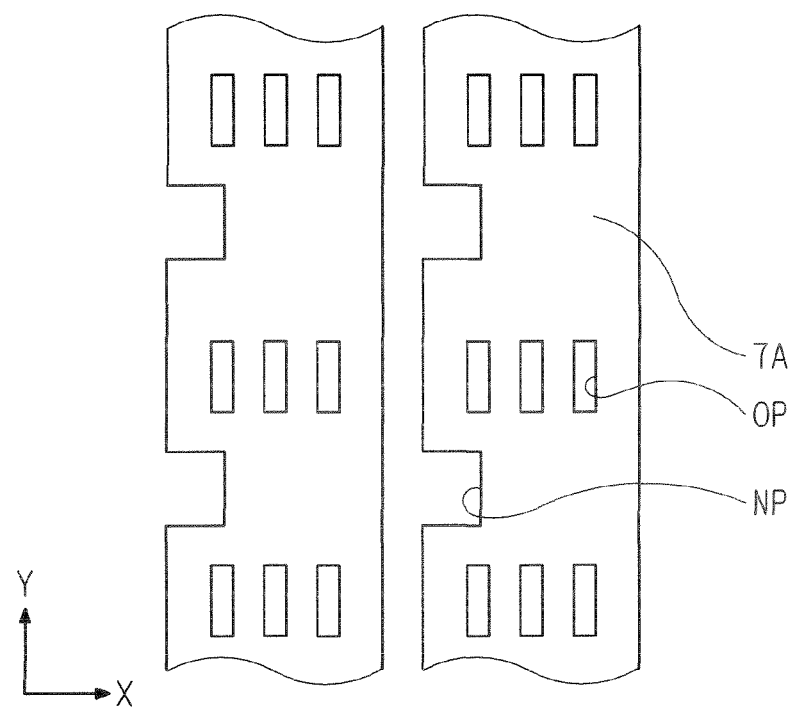
FIG. 6 is a plan view showing the structure of a common electrode according to the modification of the liquid crystal display of the preferred embodiment of the present invention.

FIG. 6 shows the planar shape of the common electrodes 7A. As shown in FIG. 6, the common electrodes 7A have the shape of an elongated flat plate. Cutout portions NP are formed in one of the long sides of the flat plate at positions corresponding to those above the TFTs 32, and multiple opening portions OP in the form of a slit are formed at positions corresponding to those above the pixel electrodes 4A.

A fringing electric field generated between the common electrodes 7A and the pixel electrodes 4A via the opening portions OP drives a liquid crystal horizontally (laterally). The positions of the pixel electrodes 4A and the common electrodes 7A may be reversed vertically. In this case, opening portions in the form of a slit are formed in the pixel electrodes 4A in an upper layer.

The pixel electrodes 4A each have an edge portion in the Y direction connected to an upper part of a drain electrode 63 of the TFT 32. The drain electrode 63 has a length that entirely covers a lower part of this edge portion of the pixel electrode 4A.

The aforementioned shapes of the pixel electrodes 4A and the common electrodes 7A are merely examples. The shapes and the like of the pixel electrodes 4A and the common electrodes 7A can be determined in different ways as long as these electrodes are arranged in different layers while an insulating film is placed between these layers.

An auxiliary capacitance line 33 is arranged in parallel with a gate line 31 so as to form a pair with the gate line 31. The common electrodes 7A are electrically connected to the auxiliary capacitance line 33 via a contact hole 34.

The gate line 31 is formed so as to be integral with a gate electrode of the TFT 32 in each pixel. A region corresponding to that above a part of the gate line 31 belonging to the TFT 32 is a channel region 62. A source electrode 61 extending from the source line 6 is arranged in parallel with the channel region 62, and the drain electrode 63 is arranged on the opposite side of the source electrode 61.

Figure 5:
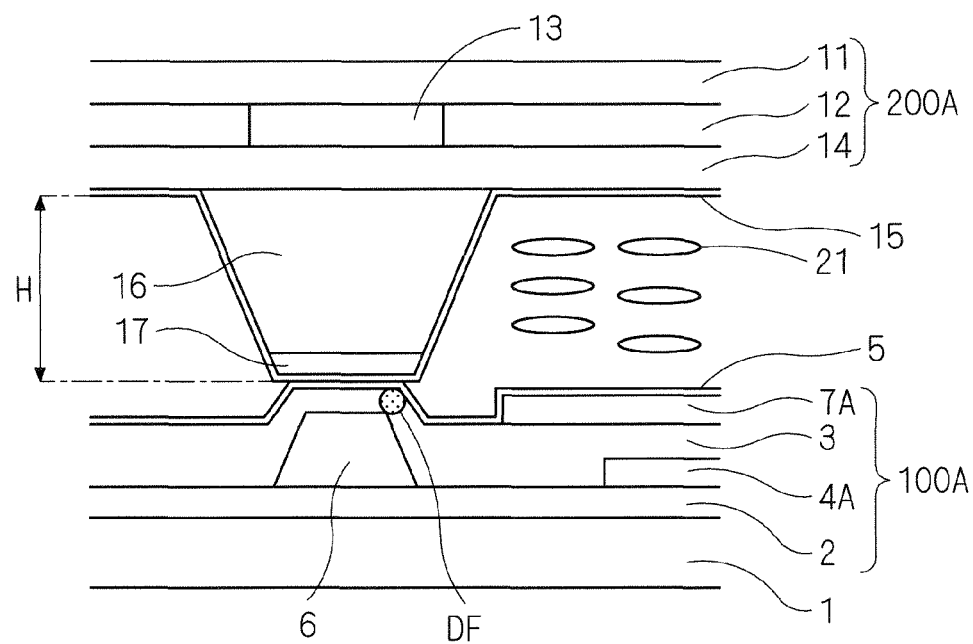
FIG. 5 is a partial sectional view showing a liquid crystal panel according to the modification of the liquid crystal display of the preferred embodiment of the present invention.

As shown in FIG. 5, liquid crystal molecules 21 are held between a TFT 100A and an opposite substrate 200A facing each other. In the TFT substrate 100A, a below-source insulating film 2 is arranged on a glass substrate 1, a source line 6 and the pixel electrode 4A are arranged on the below-source insulating film 2, and an above-source insulating film 3 is arranged so as to cover the source line 6, the pixel electrode 4A, and the below-source insulating film 2. Further, the common electrode 7A is arranged on the above-source insulating film 3, and an alignment film 5 is arranged so as to cover the common electrode 7A and the above-source insulating film 3.

In the opposite substrate 200A, color layers 12 are arranged on a glass substrate 11 to be spaced apart from each other, and a BM 13 is arranged between the color layers 12. Further, an organic overcoat film 14 is arranged so as to cover the color layers 12 and the BM 13, and a protrusion 16 protruding toward the source line 6 is arranged above the overcoat film 14 via an alignment film 15.

The protrusion 16 is arranged above the source line 6 so as to extend in a direction in which the source line 6 extends. The protrusion 16 is trapezoidal in cross section, with a wide edge surface near the glass substrate 11 and a narrow edge surface near the source line 6. The edge surface of the protrusion 16 near the source line 6 is covered with a conductive film 17. The protrusion 16 and the conductive film 17 are covered with the alignment film 15.

As described above, in the TFT substrate 100A, the pixel electrodes 4A and the common electrodes 7A are arranged in different layers on the substrate, and electric charges accumulated between the pixel electrodes 4A and the common electrodes 7A control driving of liquid crystal molecules 21. A transparent conductive film made of a material such as ITO and IZO, and a metal film made of a material such as Cr and Al, are applicable as a conductive film to form the aforementioned electrodes.

The protrusion 16 provided inside the opposite substrate 200A is formed into a linear shape extending entirely across a region facing the source line 6. The conductive film 17 provided at an edge portion of the protrusion 16 is an electrically floating condition, specifically, is formed independently of the edge portion of the protrusion 16. The protrusion 16 is covered with the alignment film 15 so as not to electrically contact a line or an electrode.

As shown in FIG. 5, the thicknesses of the protrusion 16 and the conductive film 17 are determined such that, with the TFT substrate 100A and the opposite substrate 200A facing each other, the conductive film 17 arranged at the edge portion of the protrusion 16 contacts the above-source insulating film 3 covering the source line 6 via the alignment films 15 and 5.

The protrusion 16 is composed of an insulator such as an organic film, and the conductive film 17 is composed of an ITO film or a metal film, for example.

The liquid crystal display of the IPS-FFS structure characteristically arranges the liquid crystal molecules 21 in parallel with a substrate more strictly than the IPS driving system. Further, the insulating protrusion 16 is provided inside the opposite substrate 200A, the conductive film 17 is arranged at the edge portion of the protrusion 16, and the conductive film 17 is formed so as to contact the above-source insulating film 3 covering the source line 6 via the alignment films 15 and 5. As a result, an electric field generated from the source line 6 is shielded by the conductive film 17. Thus, the electric field generated from the source line 6 does not disturb a lateral electric field, so that the liquid crystal molecules 21 are driven in parallel with a substrate surface and arrangement of the liquid crystal molecules 21 at the side of the source line 6 is unlikely to be disturbed. As a result, reduction in contrast and reduction in aperture ratio are suppressed at the side of the source line 6, thereby allowing suppression of reduction in image quality.

According to the aforementioned structure, the conductive film 17 formed at the edge portion of the protrusion 16 is an electrically floating condition. Thus, even if a defect DF such as a foreign matter is generated in the above-source insulating film 3 on the source line 6 and the source line 6 and the conductive film 17 are electrically connected via the defect DF, the source line 6 and the conductive film 17 are not shorted to each other via the defect DF.

To be specific, the source line 6 is not shorted to the protrusion 16 and the conductive film 17 provided to shield an electric field generated from the source line 6, so that a linear defect due to a short in the source line 6 is not generated. Thus, a linear defect is not recognized visually when the liquid crystal panel is driven, thereby preventing reduction in manufacturing yield.

The conductive film 17 provided at the edge portion of the protrusion 16 in the opposite substrate 200A and the above-source insulating film 3 provided on the source line 6 in the TFT substrate 100A tightly contact each other via the alignment films 5 and 15. This prevents entry of the liquid crystal molecules 21 into space above the source line 6, thereby achieving the effect of preventing disturbance of arrangement of the liquid crystal molecules 21.

In order to achieve this effect, it is desirable that a combined height of the protrusion 16 and the conductive film 17 be the same as a cell gap of the liquid crystal panel, specifically a gap between the apex of the TFT substrate 100A and the apex of the opposite substrate 200A. In FIG. 5, the cell gap is indicated by H.

In the aforementioned structure, the conductive film 17 and the above-source insulating film 3 tightly contact each other via the alignment films 5 and 15. Meanwhile, even if the alignment films 5 and 15 do not contact each other and a gap is formed therebetween, the conductive film 17 can still shield an electric field generated from the source line 6.

Making the conductive film 17 wider than the source line 6 can reliably shield an electric field generated from the source line 6. Meanwhile, the width of the conductive film 17 is determined based on the cell gap and the combined height of the protrusion 16 and the conductive film 17, for example.

The preferred embodiment of the present invention can be modified or omitted where appropriate without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display that drives liquid crystal molecules laterally with a lateral electric field, comprising:
  a thin film transistor substrate with a plurality of pixel regions arranged in a matrix;
  an opposite substrate with a color filter arranged in a position corresponding to those of said pixel regions; and
  a liquid crystal held between said thin film transistor substrate and said opposite substrate arranged to face each other,
  said thin film transistor substrate including
  a source line and a gate line arranged to cross each other in a grid pattern, and a thin film transistor arranged at the intersection between said source line and said gate line, said source line being covered with an insulating film and the insulating film being covered with a first alignment film, said opposite substrate including a protrusion arranged so as to protrude toward said thin film transistor substrate, wherein said protrusion is entirely composed of an insulating material, with said thin film transistor substrate and said opposite substrate arranged to face each other, said protrusion being arranged so as to overlap said source line from above and to extend in a direction in which said source line extends, said protrusion having a conductive film arranged directly on an edge surface of said protrusion near said source line, said protrusion and said conductive film being covered with a second alignment film, said conductive film arranged nearer to said source line than said opposite substrate.

2. The liquid crystal display according to claim 1, wherein said conductive film is independently provided on said edge surface of said protrusion.

3. The liquid crystal display according to claim 2, wherein the thicknesses of said protrusion and said conductive film are determined such that said conductive film tightly contacts said insulating film via said first and second alignment films.

4. The liquid crystal display according to claim 2, wherein said conductive film is greater in width than said source line.

5. The liquid crystal display according to claim 1, comprising a pixel electrode and a common electrode arranged in the same layer in said pixel regions.

6. The liquid crystal display according to claim 1, comprising a pixel electrode arranged in a first layer in said pixel regions, and a common electrode arranged in a second layer above said first layer, said common electrode being successively formed so as to extend over two or more of said pixel regions, wherein said common electrode has an opening portion formed at a position corresponding to a position above said pixel electrode.

* * * * *